Patented Nov. 24, 1931

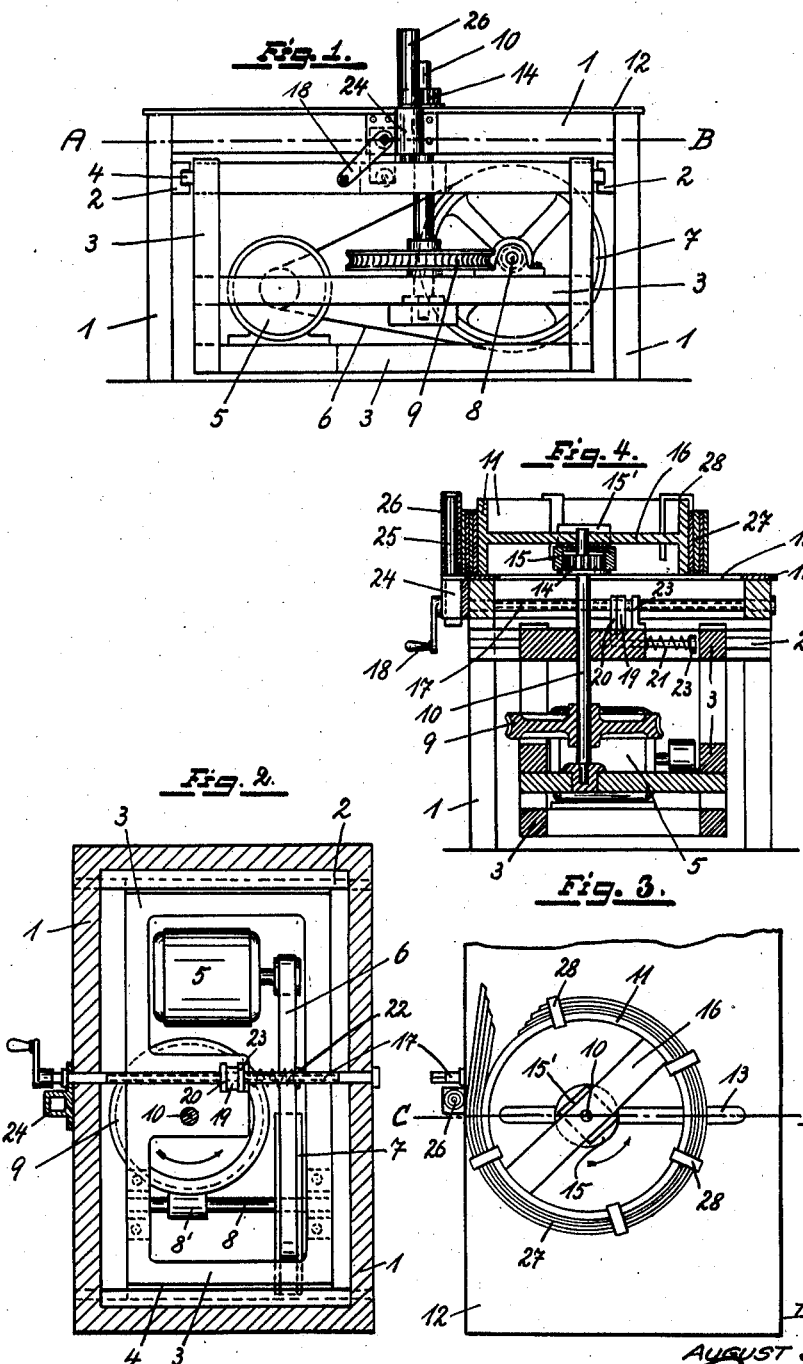

1,833,267

UNITED STATES PATENT OFFICE

AUGUST SOMMER, OF WURTTEMBERG, GERMANY

WOOD BENDING MACHINE

Application filed August 19, 1929, Serial No. 386,945, and in Germany September 19, 1928.

The invention relates to wood bending machines, and more particularly to machines for bending wood into hoops, or elliptical shapes, or squares with rounded corners and the like, and the invention is concerned with machines of the kind in which the wood is bent upon a rotating mold, between which and an abutment it is pressed.

It is usual in machines of this kind to make the abutment movable and adjustable on the work table, so that it can be set according to the size of the mold and the thickness of the work on the mold. This entails some inconvenience when the mold is small, because the work is then at a considerable distance from the edge of the work table. According to my invention this inconvenience is overcome by having the abutment and the work table in a fixed positional relation to each other, the adjustment being effected by moving the mold holder in relation to the table, or the table in relation to the mold holder.

A machine according to the invention is shown in the accompanying drawings, in which Fig. 1 is a front elevation thereof, and Fig. 2 a horizontal section on the line A—B of Fig. 1.

Fig. 3 is a plan view, with work on the machine, and

Fig. 4 is a cross section on the line C—D of Fig. 3.

The machine has a main frame 1 which, together with a top or cover to be referred to hereinafter, constitutes the work table. This main frame 1 has fixed within it supports 2 for an inner frame 3, the latter having ribs 4 engaging slots in the supports 2, so that the frame 3 is horizontally movable.

Within the frame 3 is an electromotor 5, which by means of a belt 6 and pulley 7 drives a worm shaft 8, the worm $8^1$ engaging a worm wheel 9 on a vertical shaft 10. The mold 11 on which the wood is bent is fixed to the upper end of the shaft 10, above a cover or table top 12 having a slot 13 for the shaft. For fixing the mold to the shaft 10 there is a spur wheel 14 on the shaft, adapted to engage an internally toothed socket 15 at the base of a slotted mold holder $15^1$, the mold having a crossbar 16 adapted to fit into the slot of the holder $15^1$. The shaft 10 passes through a hole in the crossbar 16.

A screw spindle 17 with a crank handle 18 is mounted in the frame 1, and has thereon a rider 19. This rider is faced on one side by the vertical arm of a rectangular member 20, which is slidable in the frame 3, to a limited extent, and has upon its horizontal arm a powerful coiled buffer spring 21, placed between a portion of the frame 3 and a collar 22 on the horizontal arm. By moving in one direction the rider, abutting against the member 20, compresses the spring and moves the frame 3 in the same direction. On the opposite side the rider is faced by an abutment 23 projecting from the frame 3, so that the frame 3 can also be moved in the opposite direction by the rider.

At one side of the frame 1 there is a bearing 24, into which can be inserted a vertical spindle 25 with a roller 26 thereon, serving as an abutment for the work.

A circular mold 11 is shown, but it will be understood that molds of other shapes may be used, e. g. elliptical molds, or square molds with rounded corners.

For bending a laminated ring or hoop, as illustrated, the mold 11 is adjusted by rotating the screw spindle 17, so that the clearance between it and the roller 26 is substantially equal to the thickness of the ring. Strips of wood 27, cut to the proper length, are then placed between the mold and the roller, and are attached at one end to the mold, by means of a clamp 28. The electromotor is then started, so that the mold is rotated by the shaft 10, and the strips of wood are bent thereon, additional clamps 28 being applied from time to time. There may be a clutch for starting and stopping the machine.

The screw spindle may be rotated during the bending operation, for regulating the pressure on the wood, risk of excessive pressure being prevented by the spring 21.

On completion of the bending a steel hoop may be slipped on to the ring, prior to removing the ring, with the mold, to the drying apparatus.

In the case of molds which are not circular the spindle 17 is rotated continuously, or from time to time, in the course of the bending operation, for so adjusting the mold in relation to the roller 26 that the proper pressure is always applied to the work.

It will be understood that alternatively the frame 3 may be fixed, the frame 1 being movable in relation thereto. For this purpose the frame 3 may be fixed to the floor, and the frame 1 have shorter legs. In all other respects the mechanism may be precisely the same, and the advantage of having the bending performed at the edge of the work table is retained.

What I claim as my invention and desire to secure by Letters Patent of the United States is:—

In a wood bending machine the combination of a work table, an abutment for the work on said table, fixed to said table, near one edge thereof, a rotatable mold holder, so placed in relation to said abutment, that strips of wood held against the mold are bent into ring shape on the mold by said abutment during rotation of the mold, driving mechanism for said mold holder, a movable support for said work holder and driving mechanism, and means including a screw spindle and a buffer spring for moving said support so that said mold holder approaches said abutment.

In witness whereof I have signed this specification.

AUGUST SOMMER.